United States Patent
Xue et al.

(10) Patent No.: US 9,967,370 B2
(45) Date of Patent: May 8, 2018

(54) ODATA ENABLED MOBILE SOFTWARE APPLICATIONS

(71) Applicant: SAP SE, Walldorf (DE)

(72) Inventors: Yunjiao Xue, Waterloo (CA); David Brandow, Guelph (CA); Yan Gong, Waterloo (CA); Jason Hoos, Schaumburg, IL (US)

(73) Assignee: SAP SE, Walldorf (DE)

( * ) Notice: Subject to any disclaimer, the term of this patent is extended or adjusted under 35 U.S.C. 154(b) by 461 days.

(21) Appl. No.: 14/478,614

(22) Filed: Sep. 5, 2014

(65) Prior Publication Data

US 2016/0072927 A1 Mar. 10, 2016

(51) Int. Cl.
*H04L 29/06* (2006.01)
*H04L 29/08* (2006.01)

(52) U.S. Cl.
CPC .............. *H04L 69/08* (2013.01); *H04L 67/02* (2013.01); *H04L 69/18* (2013.01)

(58) Field of Classification Search
CPC .......... H04L 69/08; H04L 67/02; H04L 69/18
See application file for complete search history.

(56) References Cited

U.S. PATENT DOCUMENTS

| | | | | |
|---|---|---|---|---|
| 2012/0246190 A1* | 9/2012 | Surtani | ............. | G06F 17/30584 707/769 |
| 2013/0144878 A1* | 6/2013 | James | ............. | G06F 17/30525 707/736 |
| 2013/0159468 A1* | 6/2013 | Kusterer | ............. | H04L 67/2823 709/219 |
| 2013/0318061 A1* | 11/2013 | Said | ............. | G06F 17/30171 707/705 |
| 2014/0013451 A1* | 1/2014 | Kulka | ............. | G06F 21/14 726/29 |
| 2014/0372367 A1* | 12/2014 | McLean | ............. | G06F 21/6218 707/603 |

OTHER PUBLICATIONS

Authors: Michael Pizzo, Ralf Handl, Martin Zurmuehl Title: OASIS OData Version 4.0 Part 1: Protocol—OASIS Standard Date: Feb. 24, 2014.*
SAP AG HTTP Request Response Mapping 2014 https://help.sap.com/saphelp_smp303sdk/helpdata/en/7c/12df7c700610149061e2769179245f/frameset.htm (Year: 2014).*

* cited by examiner

*Primary Examiner* — Nicholas R Taylor
*Assistant Examiner* — Tania M Pena-Santana
(74) *Attorney, Agent, or Firm* — Jones Day

(57) ABSTRACT

A system and a method for accessing data objects provided through an OData service involve receiving, at an application server, a data access request from a client computing device. The data access request specifies in a platform-independent manner an access operation to be performed on a first data object. The application server translates the data access request into an OData compliant request. The OData compliant request is then transmitted to the OData service to perform the access operation.

20 Claims, 5 Drawing Sheets

500

Receive data access request that specifies an access operation to be performed on a data object in the client's data model.

Determine that the data access request involves an object in an OData service
510

↓

Form a complete URL referencing a corresponding object in the OData service
512

↓

(For Create and Update operations)

Format client supplied data into an OData compliant data body
514

↓

Add OData compliant header and optional authentication header
516

↓

Select HTTP method based on the type of access operation to be performed
518

↓

Transmit an OData compliant request including the complete URL, header(s) and, if applicable, the data body
520

Fig. 5

ODATA ENABLED MOBILE SOFTWARE APPLICATIONS

FIELD OF THE INVENTION

The present invention relates to providing data access to Open Data Protocol (OData) services by mobile software applications, in particular, mobile applications that send data access requests in a format that is non-compliant with OData requirements.

BACKGROUND INFORMATION

OData is a Web-based data access protocol for requesting and updating data. OData applies and builds upon Web technologies such as Hypertext Transfer Protocol (HTTP), Atom Publishing Protocol (AtomPub), and JavaScript® Object Notation (JSON) to provide access to information from a variety of applications, services, and data stores. OData may be used to expose and access information from a variety of sources including, but not limited to, relational databases, file systems, content management systems and traditional Web sites.

Software applications can be written to support OData access. However, doing so often requires a native programming solution that is specific to a particular mobile platform such as Android or iOS. To implement OData functionality, platform specific code must be written for each platform on which an application is to be deployed. One alternative is to write the application as a Web application, using a common JavaScript library that provides cross-platform OData access. However, such Web applications may not perform as well as native software applications and can sometimes have compatibility problems. Therefore, a need exists for a way to enable applications to be created in a platform-independent manner while also providing OData functionality.

SUMMARY

Example embodiments of the present invention relate to a system and methods for providing data access to OData services for mobile applications.

In an example embodiment, a mobile application is created in a software development environment that includes a software tool for creating and configuring the application for accessing an OData service. The application is created by defining interactions between user interface elements of the application and data objects. The definitions are platform-independent metadata, so that the data access requests issued by the application are also platform-independent. The application is deployed to an intermediary application server. The definitions are then loaded onto a client device so that requests for data exposed by the OData service can be sent from the client device.

In an example embodiment, an intermediary application server, which can be implemented as software executing on at least one computer, translates a data access request from a mobile application into an OData compliant request. Upon receiving the data access request, the intermediary application server determines that an access operation specified by the request involves a data object in an OData service. In response, the intermediary application server translates the request into an OData compliant request. The details of the translation process may vary depending on the type of access operation to be performed. For example, requests for creating or updating data may include a data body that is modified by the application server as part of the translation process. In contrast, read requests or delete requests may not include data bodies.

BRIEF DESCRIPTION OF THE DRAWINGS

FIG. 5 is a flowchart of a method for forming an OData compliant request according to an example embodiment of the present invention.

DETAILED DESCRIPTION

Example embodiments of the present invention relate to a system and methods for providing access to an OData service by mobile applications. Embodiments are described in which a client application on a mobile device sends requests for accessing a data object on a back end server that provides an OData service. The example embodiments enable the client application to access the data object (which is supplied by the back end server in an OData format) without requiring that the client application be configured to send OData compliant requests.

Example embodiments build upon the Agentry™ component of SAP Mobile Platform (SMP), but are also applicable and/or extendable to support OData access in other mobile computing environments.

In an example embodiment, a system and a corresponding method for accessing data objects provided through an OData service include receiving, at an application server, a data access request from a client computing device. The data access request is issued through a client application executing on a mobile computing platform of the client computing device. The data access request specifies in a platform-independent manner an access operation to be performed on a first data object provided by an OData service. The processor translates the data access request into an OData compliant request. The OData compliant request is transmitted to the third computing device to perform the access operation.

Figure 1:
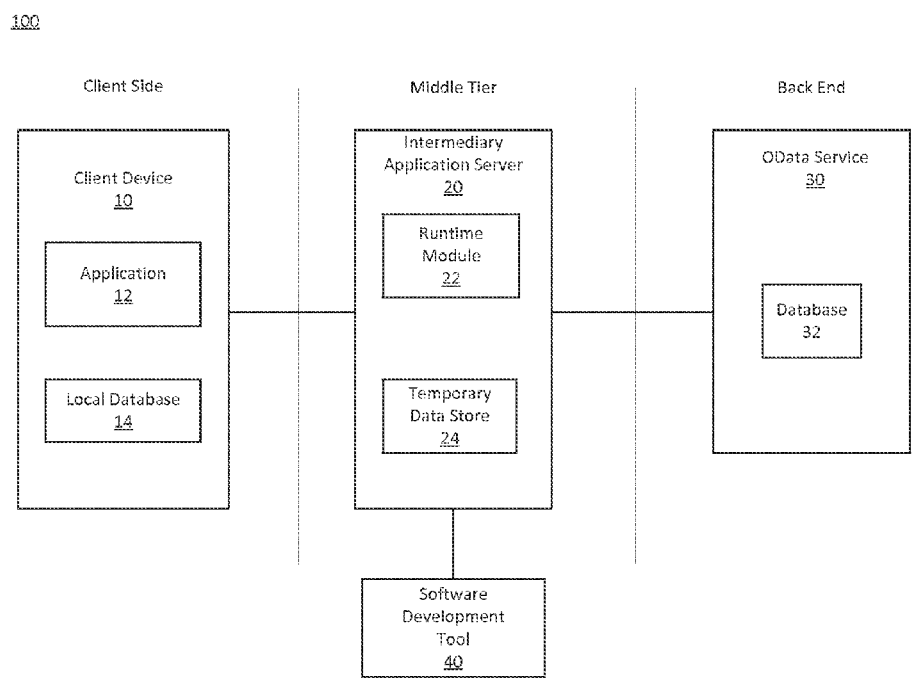
FIG. 1 is a block diagram of a system for accessing data objects provided through an OData service according to an example embodiment of the present invention.

FIG. 1 shows a system 100 for accessing an OData service according to an example embodiment of the present invention. The system 100 is divided into three sections: a client side, a middle tier and a back end. The client side includes a client device 10, which is a mobile computing device such as a laptop, a tablet or a smartphone. The middle tier includes an intermediary application server 20. The back end includes an OData service 30. Additionally, the system 100 may include a software development tool 40 by which a developer creates the application 12.

The client device 10 includes a software application 12 and a local database 14. The application 12 includes a set of definitions, which are loaded from the intermediary application server 20, and which does not need to be specifically configured to handle OData. For example, data access requests from the application 12 may be formatted in way that is non-compliant with OData protocol. Additionally, a format in which data objects are stored in the database 14 does not need to be the same as a format in which data objects are provided by the OData service 30. The client device 10 is not platform specific, but is instead representative of a mobile device running one of any number of conventional mobile platforms such as Windows Mobile, Palm OS, Android and iOS.

The intermediary application server 20 manages the application 12 and may be implemented as an SMP server that executes a runtime module 22, for example, an Agentry™ runtime component. The runtime module 22 handles data access requests from the client device 10 to the OData service 30. The intermediary application server 20 may also include a temporary data store 24 as a storage area for data in connection with the data requests. The format in which the data store 24 stores data does not need to be the same as the format of the database 14 or a database 32 that the OData service 30 exposes.

The OData service 30 includes a database 32, which stores data objects that are accessed (e.g., created, read, modified or deleted) in response to client requests. Responses to data access requests referring to the data objects in the database 32 are output using the OData protocol, and the OData service 30 may only be responsive to OData compliant requests.

In an example embodiment, the intermediary application server 20 may operate as an intermediary between the client device 10 and an additional data service besides the OData service 30, for example, a Structured Query Language (SQL) server or a Web service. Thus, the intermediary application server 20 may be configured to handle SQL requests and/or generic HTTP requests. For example, a generic HTTP request to a Web service may be formatted according to the Simple Object Access Protocol (SOAP). A Web service receiving this generic HTTP request may return Extensible Markup Language (XML) data. Thus, the application 12 may communicate with multiple types of back end services such as relational databases, Java servlets, Web services or file systems.

The tool 40 may provide an integrated development environment (IDE) for creating and deploying software applications that use the server 20 as an intermediary, e.g., for deploying the application 12. In an example embodiment, the application 12 includes a set of definitions created using the development tool 40 at the design stage and encoded by the tool 40 as metadata. Then, the definitions are deployed to the intermediary application server 20 before being loaded by the client device 10, which executes those definitions.

The tool 40 may be implemented as an extension of Agentry™ Editor, the existing functionality of which enables developers to create applications by defining interactions between user interface elements (e.g., display screens, menus, buttons, etc.) and data objects in a declarative manner, by defining the attributes of the user interface elements and the data objects. For example, a display screen may be defined to include a set of lists, labels and buttons. User interactions may also be defined, such as what happens when the user clicks on a button (e.g., another screen may be displayed or data entered on the current screen may be saved into a database). These definitions are specified at the application development stage and may be loaded into the client device 10, which then interprets the definitions to execute the application 12 in cooperation with the runtime module 22. The definitions may also be deployed into the runtime module 22 to enable the runtime module 22 to properly respond to requests from the application 12. In this regard, the application 12 may not be a standalone program that includes all the program instructions used to manipulate data objects. Instead, the application 12 may include a set of metadata definitions and a software interface to the runtime module 22 in the server 20, while the server 20 executes the program instructions in response to requests from the application 12. Thus, the application 12 may, in some embodiments, be a lightweight client that responds to program instructions located in the server 20.

In contrast to programmatic programming styles, where the control logic governing data transactions is explicitly written in code, declarative programming focuses on the properties (metadata) of data objects and how those properties are created and/or modified, but without specifying the details of how property creation/modification are implemented. The declarative style is advantageous because it frees the developer from being concerned with writing platform specific code for performing the same transactions in different platforms.

Figure 2:
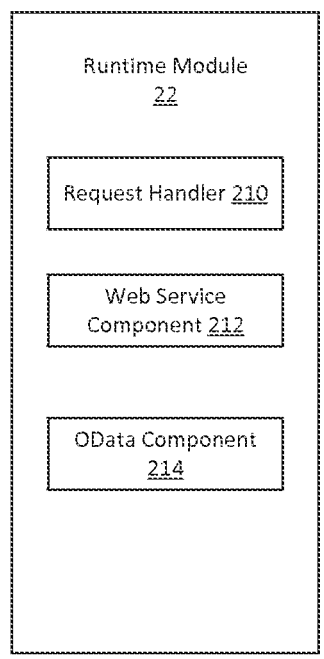
FIG. 2 is a block diagram of a runtime module in an intermediary application server according to an example embodiment of the present invention.

FIG. 2 shows an example embodiment of the runtime module 22, which may include a request handler 210, a Web service component 212 and an OData component 214. The request handler 210 receives requests from the client device 10 and determines how to serve those requests, using information provided by the components 212, 214. As explained later, the request handler 210 may obtain back end configuration information to form, based on the type of OData access requested, an appropriately formatted HTTP request and transmit the HTTP request to the OData service 30 in substitution for an access request from the client device 10. The request handler 210 may also process a response from the OData service 30 to format the response for consumption by the application 12, for example when the response returns a data object that is the subject of a read request.

The Web service component 212 may include a list of Web services to which client requests may be directed, in addition to back end configuration information such as a list of Uniform Resource Locators (URLs) and/or port settings associated with the Web services. Similarly, the OData component 214 may include a list of OData services and corresponding URLs and/or port settings associated with the OData services. Additionally, the OData component may include definitions and control logic that handle different types of OData access operations, such as create, read, update and/or delete operations. In one embodiment, the runtime module 22 may include additional components that handle connections to other types of back end services such as SQL databases.

Figure 3:
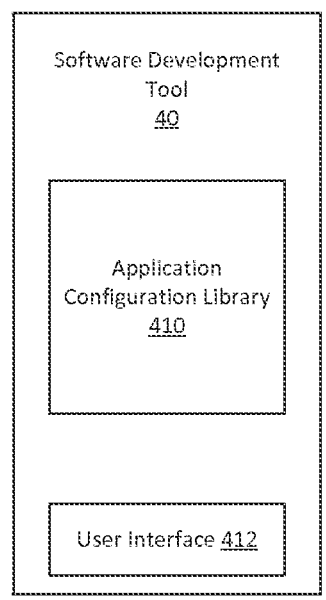
FIG. 3 is a block diagram of a software development tool according to an example embodiment of the present invention.

FIG. 3 shows an example embodiment of the software development tool 40. The tool 40 may include an application configuration library 410 and a user interface 412. The library 410 may specify, e.g., in a set of XML files, what back end types are supported. The library 410 may also define processes that control how the runtime module 22 handles different types of OData operations, and define OData compliant HTTP requests that will be handled by the runtime module 22. This OData specific information may be deployed to the runtime module 22, for example, into the OData component 214 when the application 12 and/or the OData service 30 are configured at the intermediary application server 20.

To enable translation of the data access request into an OData compliant request and mapping of an OData response that includes XML data (e.g., a response to a read request) to a data object in a metadata model of the application 12, several parameters may be defined using the software development tool 40. Some parameters may be defined at the application development stage, while others may be defined when the application 12 is configured on the application server 20. The parameters include, but are not limited to, a base URL, a Base XPath, an XPath and an OData-specific XML namespace.

The base URL may be defined when the application 12 is configured on the application server 20, and is used for addressing the OData service 30. An example base URL is:
http://SERVER_HOST_NAME:PORT_NUMBER/
OData_Service.svc/.

The Base XPath and Xpath may be specified at the design stage to enable mapping of an OData response to a corresponding property of a data object in the metadata model shared by the application 12 and the server 20. The XML namespace is also used to enable mapping, but can be specified later, when the application server 20 is configured. The XML namespace for OData services is different from an XML namespace used for other types of data services. The XML namespace may be included in the beginning of a data body of an accessing request and the value of the XML namespace for OData services may, for example, be set to:
d|http://schemas.microsoft.com/ado/2007/08/dataservices|m|http://schemas.microsoft.com/ado/2007/08/dataservices/metadata|sap|http://www.sap.com/Protocols/SAP-Data|default|http://www.w3.org/2005/Atom. The runtime module 22 uses namespaces to parse XML data contained in an HTTP response, and uses this particular namespace for parsing XML data in an OData response.

Figure 4:
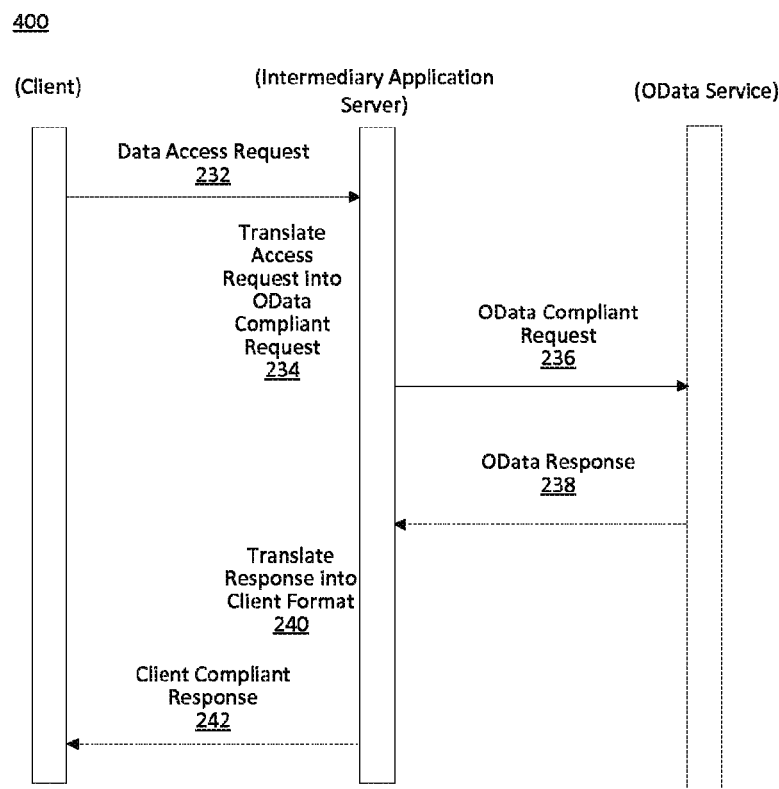
FIG. 4 is a flowchart of a method for accessing data objects provided through an OData service according to an example embodiment of the present invention.

FIG. 4 is a flowchart of a method 400 for accessing data objects provided through an OData service according to an example embodiment of the present invention. The method 400 may be performed at the system 100 after the application 12 is installed or loaded at the client device 10, and after the back end connection to the OData service 30 has been configured at the intermediary application server 20 so that the server 20 is ready to serve requests directed to the OData service 30. The method 400 includes steps performed by the client device 10, the intermediary application server 20 and the OData service 30.

At step 232, the client transmits a data access request to the intermediary application server 20. When an end user action is performed in the client application 12 such as clicking a button after inputting new data, this may generate a transaction that includes a data access operation to be performed at the service 30. To initiate the access operation, the application 12 generates a data access request that references a data object according to the metadata model defined in the application 12. For example, the request may specify an object property for which a new value is being defined or for which an existing value is to be read. The actual data object that is the subject of the transaction may be located in the database 32. The application 12 may sometimes reference data objects in other back end services, such as an object in a SQL database.

To illustrate processing of a request involving an OData service, reference is made herein to an example transaction called "AddCustomer" that creates a new customer in the OData back end by referring to a data object called "Customer." The AddCustomer transaction may include an OData step that inserts a new customer into the database 32 via the OData service 30, using information supplied by the end user through the user interface of the application 12.

At step 234, the server 20 responds to the data access request by translating the request into an OData compliant HTTP request. Translation may be performed based on the definitions and control logic in the OData component 214 of the runtime module 22. The translation may include forming a complete URL by combining the base URL, which is stored at the server 20, with an object identifier in the data access request. From the application's perspective the URL is the object identifier, but the complete URL is required to access the corresponding object in the database 32. Additionally, the server 20 may modify a data body for those requests that include a data body. For example, when creating or updating data, the request may include an XML data body with property tags corresponding to properties of an object being created/updated. The runtime component 22 replaces these tags with actual values prior to transmission to the OData service 30.

At step 236, the server 20 transmits the OData compliant request to the service 30, which processes the request and executes the transaction to generate an OData response (step 238).

At step 240, the server 20 receives the OData response and translates the response into a format that is understood by the application 12, e.g., by mapping the response to a corresponding property of an object in the application's metadata model using the XML namespace, plus the Base XPath and the XPath. The OData service knows which data object to operate on based on the URL. Therefore, mapping to the application object is not required when creating, updating or deleting data in an OData service.

At step 242, the server 20 transmits the client compliant response to the client device 10, where the client compliant response is processed according to the metadata definitions of the application 12. For example, the client compliant response may include an acknowledgement that the Add-Customer transaction was executed successfully. When the application 12 receives this acknowledgement, a confirmation screen may be displayed.

FIG. 5 is a flowchart of a method 500 for forming an OData compliant request according to an example embodiment of the present invention. The method 500 may be performed at the intermediary application server 20 to implement the steps 232 to 236 in FIG. 4.

At step 510, the server 20 receives a data access request including a transaction to be performed on a first data object. In the OData service 30 data model, the data object may be identified using the name of a corresponding entity set, e.g., "Customers" may be an entity set associated with all Customer objects in the database 32. The server 20 determines that the transaction involves a data object in the OData service 30, and therefore proceeds to translate the request into an OData compliant request.

At step 512, the server 20 forms a complete URL referencing a corresponding object in the OData service 30, thereby mapping the data object in the data access request to the corresponding object in the service 30. The format of the complete URL may depend on the type of access operation being performed. For example, the complete URL for data read operations or data create operations may be formed by combining the base URL with the entity set name. Referring back to the example base URL mentioned earlier, an example complete URL may be:
http://SERVER_HOST_NAME:PORT_NUMBER/
OData_Service.svc/Customers.

The server 20 selects the base URL based on information supplied during the configuration of the deployed application 12, when the back end connections to the OData service 30 were set up. Because the server 20 shares the same set of definitions as the application 12 in the client 10, the server 20 knows the format of the complete URL to be generated in response to any particular request from the application 12. An example complete URL for a data update operation or a data delete operation may combine the base URL, the entity set name and identifier property of the object, e.g., Customers ('<<transaction.CustomerID>>'). In this example, <<transaction.CustomerID>> is an XML tag that will be replaced with the actual value of CustomerID by the runtime module 22 prior to transmitting the request to the service 30. The entity set name, identifier property, and actual value are all specified in the data access request from the client.

Step 514 may be performed when the request involves a data create operation or a data update operation. At step 514, the server 20 formats data supplied in the data access request (e.g., in an XML data body) into an OData compliant data body, which may also be XML formatted. The server 20 does this by substituting the actual values for the XML based property tags, as mentioned earlier. The OData compliant data body may include, in addition to the XML namespace described earlier, one or more object properties, for example:

```
<m:properties>
    <d:CustomerID
m:type="Edm.String"><<transaction.CustomerID>></d:CustomerID>
    <d:CompanyName
m:type="Edm.String"><<transaction.CompanyName>>
</d:CompanyName>
    <d:ContactName
m:type="Edm.String"><<transaction.ContactName>></d:ContactName>
</m:properties>
```

At step 516, the server 20 adds an OData compliant header and, when the OData service requires password authentication, an authentication header. The OData compliant header may be of the form: Content-Type: application/atom+xml.

At step 518, the server 20 includes an HTTP method in the OData compliant request based on the type of access operation to be performed. The HTTP methods for data read, data create, and date delete operations may be GET, POST, and DELETE, respectively. For data update operations, the method may be MERGE or alternatively, when HTTP tunnel technology is used, POST. The HTTP method is included in the data access request and selected according to the application definitions specified during the design stage.

At step 520, the server 20 transmits the OData compliant request as a specially formatted HTTP request that includes the complete URL, the OData compliant header and, when required by the data access request, the OData compliant data body.

An example embodiment of the present invention is directed to one or more processors, which can be implemented using any conventional processing circuit and device or combination thereof, e.g., a CPU of a Personal Computer (PC) or a mobile computer or other workstation processor, to execute code provided, e.g., on a hardware computer-readable medium including any conventional memory device, to perform any of the methods described herein, alone or in combination. The one or more processors can be embodied in a server or user terminal or combination thereof. The user terminal can be embodied, for example, as a desktop, laptop, hand-held device, Personal Digital Assistant (PDA), television set-top Internet appliance, mobile telephone, smart phone, etc., or as a combination of one or more thereof. The memory device can include any conventional permanent and/or temporary memory circuits or combination thereof, a non-exhaustive list of which includes Random Access Memory (RAM), Read Only Memory (ROM), Compact Disks (CD), Digital Versatile Disk (DVD), and magnetic tape.

An example embodiment of the present invention is directed to a non-transitory, hardware computer-readable medium, e.g., as described above, on which are stored instructions executable by a processor to perform any one or more of the methods described herein.

An example embodiment of the present invention is directed to a method, e.g., of a hardware component or machine, of transmitting instructions executable by a processor to perform any one or more of the methods described herein.

The above description is intended to be illustrative, and not restrictive. Those skilled in the art can appreciate from the foregoing description that the present invention may be implemented in a variety of forms, and that the various embodiments can be implemented alone or in combination. Therefore, while the embodiments of the present invention have been described in connection with particular examples thereof, the true scope of the embodiments and/or methods of the present invention should not be so limited since other modifications will become apparent to the skilled practitioner upon a study of the drawings and specification. Further, steps illustrated in the flowcharts may be omitted and/or certain step sequences may be altered, and, in certain instances multiple illustrated steps may be simultaneously performed.

What is claimed is:

1. A method for accessing data objects provided through an Open Data Protocol (OData) service, comprising:
    receiving, at an application server, a data access request from a client computing device, wherein the data access request is issued through a client application executing on a mobile computing platform of the client computing device, and wherein the data access request specifies in a platform-independent manner an access operation to be performed on a first data object by an OData service;
    at the application server, translating the data access request into an OData compliant request; and
    transmitting the OData compliant request to a third computing device to perform the access operation;
    wherein:
        the data access request identifies the first data object using a metadata model that is shared by both of the client computing device and the application server, the metadata model specifying properties of objects used by the client computing device and the application server; and
        the translating uses the metadata model to map portions of the data access request to each of: a base Uniform Resource Locator (URL), a Base XPath, an XPath, and an OData-specific Extensible Markup Language (XML) namespace.

2. The method of claim 1, wherein the metadata model defines an interaction between a user interface element of the client application and the first data object.

3. The method of claim 1, further comprising:
    when the data access request is a read request, mapping a response from the OData service to a corresponding property of an object in the metadata model.

4. The method of claim 1, wherein the translating includes adding an OData header to the OData compliant request.

5. The method of claim 1, wherein the translating includes forming a complete Uniform Resource Locator (URL) by combining a base URL stored at the application server with an identifier of the first data object.

6. The method of claim 1, wherein the translating includes forming a data body of the OData compliant request using an actual value of an object property specified in the data access request.

7. The method of claim 1, wherein:
the data access request specifies one of the following access operations: read, create, update, and delete; and
the OData compliant request includes a Hypertext Transfer Protocol (HTTP) method that varies depending on which of the access operations is specified.

8. The method of claim 1, wherein:
the data access request is a request for one of creating and updating data at the OData service; and
a body of the data access request is formatted in XML.

9. The method of claim 8, further comprising:
substituting actual data values for a property tag in the data access request, wherein the property tag corresponds to a property of the first data object.

10. A system for accessing data objects provided through an Open Data Protocol (OData) service, comprising:
an application server that receives a data access request from a client computing device, wherein the data access request is issued through a client application executing on a mobile computing platform of the client computing device, and wherein the data access request specifies in a platform-independent manner an access operation to be performed on a first data object; and
an OData service that provides access to the first data object;
wherein the application server is configured to:
translate the data access request into an OData compliant request; and
transmit the OData compliant request to the OData service, which performs the access operation;
wherein:
the data access request identifies the first data object using a metadata model that is shared by both of the client computing device and the application server share, the metadata model specifying properties of objects used by the client computing device and the application server; and
the translating uses the metadata model to map portions of the data access request to each of: a base Uniform Resource Locator (URL), a Base XPath, an XPath, and an OData-specific Extensible Markup Language (XML) namespace.

11. The system of claim 10, wherein the metadata model defines an interaction between a user interface element of the client application and the first data object.

12. The system of claim 10, wherein when the data access request is a read request, the application server maps a response from the OData service to a corresponding property of an object in the metadata model.

13. The system of claim 10, wherein the translating includes adding an OData header to the OData compliant request.

14. The system of claim 10, wherein the translating includes forming a complete Uniform Resource Locator (URL) by combining a base URL stored at the application server with an identifier of the first data object.

15. The system of claim 10, wherein the translating includes forming a data body of the OData compliant request using an actual value of an object property specified in the data access request.

16. The system of claim 10, wherein:
the data access request specifies one of the following access operations:
read, create, update, and delete; and
the OData compliant request includes a Hypertext Transfer Protocol (HTTP) method that varies depending on which of the access operations is specified.

17. The system of claim 10, wherein:
the data access request is a request for one of creating and updating data at the OData service; and
a body of the data access request is formatted in XML.

18. The system of claim 17, wherein the first computer is configured to:
substitute actual data values for a property tag in the data access request, wherein the property tag corresponds to a property of the first data object.

19. A non-transitory computer program product storing instructions which, when executed by at least one data processor forming part of at least one computing device, perform operations comprising:
receiving, at an application server, a data access request from a client computing device, wherein the data access request is issued through a client application executing on a mobile computing platform of the client computing device, and wherein the data access request specifies in a platform-independent manner an access operation to be performed on a first data object by an Open Data Protocol (OData) service;
at the application server, translating the data access request into an OData compliant request; and
transmitting the OData compliant request to a third computing device to perform the access operation;
wherein:
the data access request identifies the first data object using a metadata model that is shared by both of the client computing device and the application server share, the metadata model specifying properties of objects used by the client computing device and the application server;
the translating uses the metadata model to map portions of the data access request to each of a base Uniform Resource Locator (URL), a Base XPath, an XPath, and an OData-specific Extensible Markup Language (XML) namespace.

20. The computer program product of claim 19, wherein:
the metadata model defines an interaction between a user interface element of the client application and the first data object;
the translating includes adding an OData header to the OData compliant request;
the translating includes forming a complete Uniform Resource Locator (URL) by combining a base URL stored at the application server with an identifier of the first data object.

* * * * *